United States Patent
Figge et al.

(10) Patent No.: US 11,702,841 B2
(45) Date of Patent: Jul. 18, 2023

(54) FASTENING ARRANGEMENT WITH ANGULAR COMPENSATION FUNCTION

(71) Applicant: BÖLLHOFF VERBINDUNGSTECHNIK GmbH, Bielefeld (DE)

(72) Inventors: Hans-Ulrich Figge, Schloß Holte-Stukenbrock (DE); Michael König, Bielefeld (DE); Heinrich Heinrichs, Vlotho (DE); Gerald Welzel, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 426 days.

(21) Appl. No.: 16/955,945

(22) PCT Filed: Dec. 11, 2018

(86) PCT No.: PCT/EP2018/084416
§ 371 (c)(1),
(2) Date: Jun. 19, 2020

(87) PCT Pub. No.: WO2019/121180
PCT Pub. Date: Jun. 27, 2019

(65) Prior Publication Data
US 2020/0325685 A1    Oct. 15, 2020

(30) Foreign Application Priority Data

Dec. 21, 2017 (DE) .......................... 102017130998.5

(51) Int. Cl.
*F16B 5/02* (2006.01)
*E04D 5/14* (2006.01)
*E04B 1/41* (2006.01)

(52) U.S. Cl.
CPC ................ *E04D 5/145* (2013.01); *E04B 1/40* (2013.01); *E04D 5/146* (2013.01); *F16B 5/0225* (2013.01); *F16B 5/0233* (2013.01)

(58) Field of Classification Search
CPC .... F16B 5/0216; F16B 5/0233; F16B 5/0241; F16B 5/025; F16B 5/0258; F16B 5/065
See application file for complete search history.

(56) References Cited

U.S. PATENT DOCUMENTS

| 6,519,903 B1 | 2/2003 | Dirisamer et al. |
| 6,712,544 B2 | 3/2004 | Krüuger et al. |

(Continued)

FOREIGN PATENT DOCUMENTS

| CN | 101135331 A | 3/2008 |
| CN | 101324246 B | 9/2011 |

(Continued)

OTHER PUBLICATIONS

English machine translation of Pallu et al. EP 3199405 (Year: 2017).*

(Continued)

*Primary Examiner* — Christopher M Koehler
(74) *Attorney, Agent, or Firm* — Reising Ethington P.C.

(57) ABSTRACT

An arrangement for fastening first and second components with automatic compensation in spacing between the components has a base element with first and second axial ends and a holding structure for holding the base element in an opening of the first component. An adjusting unit screwable into the base element has a driver unit. A fastening screw is connectable to the adjusting unit via the driver unit, such that, when the fastening screw is rotated, the adjusting unit can be rotated conjointly and moved into contact with the second component. The holding structure has a holding segment arranged such that, by the holding segment, an (Continued)

Figure 1:
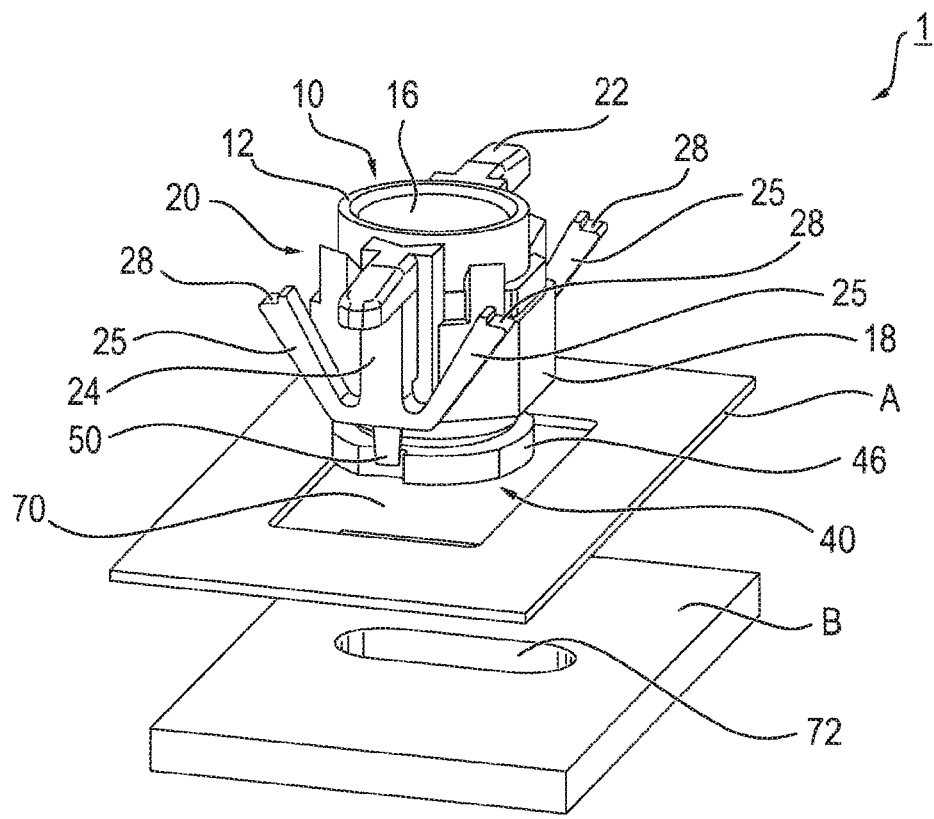

angle between the first and second component can be compensated such that, when the adjusting unit makes contact with the second component, a longitudinal axis of the fastening arrangement runs perpendicular to a plane of the second component.

18 Claims, 10 Drawing Sheets

(56) References Cited

U.S. PATENT DOCUMENTS

| | | | |
|---|---|---|---|
| 7,669,807 B2 | 3/2010 | Stigler et al. | |
| 8,066,465 B2 | 11/2011 | Figge et al. | |
| 8,220,762 B2 | 7/2012 | Stigler et al. | |
| 8,240,966 B2 | 8/2012 | Figge et al. | |
| 8,944,736 B2 * | 2/2015 | Figge | F16B 35/00 224/322 |
| 9,187,045 B2 * | 11/2015 | Bittner | B60R 9/058 |
| 10,145,399 B2 | 12/2018 | Haselberger et al. | |
| 10,344,786 B2 | 7/2019 | Jodeleit et al. | |
| 10,746,212 B2 | 8/2020 | Burger et al. | |
| 2017/0241462 A1 * | 8/2017 | Yon | F16B 5/065 |

FOREIGN PATENT DOCUMENTS

| | | |
|---|---|---|
| CN | 103747982 A | 4/2014 |
| CN | 105987055 A | 10/2016 |
| CN | 106104015 A | 11/2016 |
| CN | 205769036 U | 12/2016 |
| DE | 19809617 C2 | 5/2000 |
| DE | 10004697 A1 | 8/2001 |
| DE | 10020288 C2 | 5/2002 |
| DE | 19939178 B4 | 2/2004 |
| DE | 102006017878 A1 | 10/2007 |
| DE | 102007037242 A1 | 2/2008 |
| DE | 102008026414 A1 | 12/2009 |
| DE | 202011100696 U1 | 7/2011 |
| DE | 202011105943 U1 | 10/2011 |
| DE | 202011103827 U1 | 5/2012 |
| DE | 102012009173 A1 | 11/2012 |
| DE | 102011054861 A1 | 5/2013 |
| DE | 102012221228 A1 | 5/2014 |
| EP | 1297265 B1 | 10/2005 |
| EP | 2003346 A2 | 12/2008 |
| EP | 2543548 A1 | 1/2013 |
| EP | 3199405 A1 | 8/2017 |

OTHER PUBLICATIONS

Written Opinion & International Search Report for PCT/EP2018/084416 dated Mar. 4, 2019, 16 pages.
English translation of the International Preliminary Report on Patentability for PCT/EP2018/084416 dated Jun. 23, 2020, (9 pages).
CN Office Action for CN Application No. 201880083253.6 dated Apr. 19, 2021 (21 pages).

* cited by examiner

FASTENING ARRANGEMENT WITH ANGULAR COMPENSATION FUNCTION

1. TECHNICAL FIELD

The present disclosure is related to a fastening arrangement for fastening a first component to a second component with automatic compensation of tolerances in the spacing between the first and the second component. The present disclosure also relates to a first component in combination with a fastening arrangement as well as to a first and a second component which are fastened to each other via a fastening arrangement by means of a fastening screw, to a manufacturing method of a fastening arrangement as well as to an assembly method of a fastening arrangement.

2. BACKGROUND

Fastening arrangements are known in a large variety. Fastening arrangements with a tolerance compensation function usually consist of a base element, an adjusting bush or adjusting unit with a so-called dragging section or dragging element, which can enter into a friction connection with a fastening screw. The base element, with an adjusting unit screwed therein, is fastened in an opening in a first component. Then, the fastening screw is inserted through the opening into the second component and comes into contact with the dragging element. Therefore, when rotating the fastening screw, the adjusting bush is rotated conjointly until it abuts on the second component, upon which then, when the fastening screw is further rotated and the torque is correspondingly increased, the friction connection is overcome so that then, both components can be interlocked with each other by the fastening screw via the adjusting bush.

In certain configurations, such fastening arrangements additionally comprise an angular compensation function. As the element for realizing such an angular compensation function, usually, a spherical disc or something similar is provided at the end of the adjusting unit, which comes into contact with the second component. Therefore, an adaption to the contact surface of the second component takes place by means of the spherical disc. A longitudinal axis of the fastening arrangement does, however, still run perpendicular with respect to the plane in which there is the opening of the first component. Therefore, the spherical disc must also take up the load which is necessary for fastening the components to each other, and must be designed as well as dimensioned correspondingly. Examples for such fastening arrangements with a tolerance compensation function and angular compensation function are described, for example, in DE 10 2011 054 861 A1, DE 10 2012 009 173 A1, DE 20 2011 105 943 U1, DE 10 2008 026 414 A1, DE 20 2011 103 827 U1 and DE 20 2011 100 696 U1.

It is therefore the object of at least some implementations of the present invention to provide a fastening arrangement with a tolerance compensation function that is optimized with regard to the angular compensation function compared with the state of the art.

3. SUMMARY

The above object is solved by means of a fastening arrangement for fastening a first component to a second component with an automatic compensation of tolerances in the distance between the first and the second component, a first component in combination with a fastening arrangement, a first and a second component which are fastened to each other via the fastening arrangement by means of a fastening screw, a manufacturing method of a fastening arrangement as well as an assembly method of a fastening arrangement. Further embodiments and further developments result from the following description, the drawings as well as the appending claims.

A fastening arrangement for fastening a first component to a second component with an automatic compensation of tolerances in the spacing or distance between the first component and the second component comprises the following features: a base element with a first and a second axial end as well as a holding structure at a radial outer side for holding the base element in an opening of the first component, and an adjusting unit which can be screwed into the base element having a dragging unit inserted therein, while a fastening screw can be connected with the adjusting unit via the dragging unit through a releasable dragging connection so that when rotating the fastening screw, the adjusting unit can be rotated conjointly and can be moved in abutment with the second component, with the holding structure of the base element comprising a holding segment which, with respect to a plane perpendicular to the longitudinal axis of the base element is arranged at an angle or can be pivoted about an axis of the plane, so that an angle between the first and the second component can be compensated by means of the holding segment in a way that when the adjusting unit abuts on the second component, a longitudinal axis of the fastening arrangement runs perpendicular to a plane of the second component.

In the following, the fastening arrangement is illustrated based on its use, where three components are supposed to be connected with each other. The first component is, for example, a roof membrane, the second component is a body structure and the third component is a roof rail. The first component, i.e. the roof membrane, is arranged between the second and the third component, with a fastening of the third component to the second component may take place without any force effect onto the first component. Therefore, with respect to the exemplary roof membrane as the first component, the first component is a component which, particularly in comparison with the second component, is a thin-walled component.

Firstly, the fastening arrangement is inserted into an opening of the first component, so that the fastening arrangement is reliably arranged and held in the opening. Such an arrangement takes place via the holding structure at the outside of the base element. In this connection, the holding structure has the function of arranging the base element, and thus the fastening arrangement, at the first component so that in a later use, no or only slight forces are applied on the first component in order to not deform it. In order to prevent a conjoint rotation of the base element while assembling the fastening arrangement, the base element has an outer shape which allows a torque-proof arrangement in the opening of the first component. Furthermore, it may be preferred that the holding structure allows a movement in the opening of the first component so that tolerances can be compensated. The specific design of the holding structure as well as of the base element as a whole is discussed in more detail later in connection with the disclosed embodiments. Principally, every structure may be preferred as the holding structure with which clipping-in, i.e. an interlocking fastening, particularly by means of a locking connection, in the opening of the first component can be realized. The insertion into the first component may take place from the side of the first component, which later faces the third component.

The second component is arranged at a distance from the first component, with an opening in the second component preferably being aligned with the opening of the first component. In this connection, the second axial end of the base element faces towards the second component. A fastening screw is guided through the opening in the second component for fastening the second component and first of all comes into a frictional engagement with the dragging unit of the adjusting unit. Thus, the fastening screw forms a releasable dragging connection with the dragging unit in order to conjointly rotate the adjusting unit when the fastening screw is rotated and, thus, to move the adjusting unit for the purpose of compensating tolerances in abutment with the second component.

In a further embodiment, the base element therefore comprises a first inner thread and the adjusting unit comprises a first outer thread, with the first outer thread of the adjusting unit together with the first inner thread of the base element forming a first thread pairing of a first thread direction and the adjusting unit can be screwed into the base element from the second axial end of the base element, and the fastening screw comprises a second outer thread of a second thread direction which is contrary to the first thread direction and can be inserted through an opening of the base element and the adjusting unit, so that the adjusting unit can be moved by rotating the fastening screw into the second thread direction in abutment with the second component. For example, the first thread direction is a left-handed thread and the second thread direction is a right-handed thread.

Depending on the kind of the available holding segment, a difference is to be made between two alternative embodiments of the holding structure, when the first and the second component are not arranged parallel to each other. Generally, the holding segment provides an attachment surface in every embodiment, with which it comes into abutment with the first component, such as at a side of the first component that faces towards the second component.

In the first alternative, the holding segment is arranged at an angle with respect to a plane perpendicular to the longitudinal axis of the base element. In this connection, the angle is adapted to the angle which is present between the first and the second component in the area of the opposing openings. After inserting the fastening arrangement into the first component, the longitudinal axis is therefore already perpendicular or nearly perpendicular to the plane in which the second component lies. That means that there is an angle unequal 90° between the plane, in which the opening in the first component lies, and the longitudinal axis of the base element or fastening arrangement, respectively. Due to the arrangement of the fastening arrangement, which is aligned already perpendicular to the plane of the second component, the fastening screw can be inserted particularly easy into the fastening arrangement and can be fastened in a fastening nut in or at the third component.

In connection with this description, being arranged at an angle with respect to the plane perpendicular to the longitudinal axis of the base element means, that the holding segment, in particular the contact surfaces of the holding segment, is not arranged in the corresponding plane but includes an angle with this plane.

In the second alternative, the holding segment is pivotable about an axis in the plane. After inserting the fastening arrangement into the opening in the first component, the longitudinal axis of the fastening arrangement is therefore aligned perpendicular with respect to the plane in which the opening of the first component lies. When the fastening screw is now guided through the opening in the second component, it engages with the dragging unit, forms a releasable dragging connection with the dragging unit and conjointly rotates the adjusting unit when rotating until the adjusting unit abuts on the second component. Due to the angle compensation function which is present adjacent to the first component, the adjusting unit comes into a smooth or areal abutment with the second component, so that a longitudinal axis of the base element and the fastening structure is aligned perpendicular with respect to the plane of the opening of the second component. Accordingly, there is again an angle unequal 90° between the plane in which the opening of the first component lies and the longitudinal axis of the base element or fastening arrangement, respectively. Therefore, in contrast to the first alternative, there is an angle compensation only while the adjusting unit comes into abutment with the second component. When further rotating the fastening screw, it penetrates the fastening arrangement and engages with the fastening nut.

In both embodiments of the holding segment, the angle compensation therefore does not take place at the adjusting unit but at the base element. In this way, the fastening arrangement is aligned perpendicular with its longitudinal axis to the plane in which the opening of the second component is arranged. Therefore, a connection between the three components, e.g. roof membrane, body structure and roof rail can be achieved by means of the fastening arrangement. In this connection, the third component is fastened to the second component and the first component which lies in between does not have to take up any load. Despite the first and the second component, i.e. roof membrane and body structure, not running parallel, the fastening structure is aligned perpendicular with its longitudinal axis to the plane of the body structure, so that screwing in the fastening screw into the fastening nut is facilitated, as the longitudinal axis of the fastening nut also runs perpendicular to the plane, in which the second component is arranged.

It is therefore an advantage of the fastening arrangement that an angle between the first and the second component can be compensated such that when the adjusting unit abuts on the second component, a longitudinal axis of the fastening arrangement runs perpendicular to a plane of the second component. This facilitates the fastening of the fastening screw in the fastening nut. Furthermore, an easy handling of the fastening is realized in this way on the one hand, and on the other hand, the holding segment does not contribute to the fastening for the purpose of compensating the angle, so that in particular, no load is applied from the third or second component via the holding segment to the first component. It is furthermore advantageous, that the first axial end of the base element has a defined plane with respect to the first component. Furthermore, a spacing between the first component and the third component, which comprises the fastening nut and which is arranged at the side of the first component which faces away from the second component, can be adjusted specifically.

In a further embodiment, the holding structure of the base element includes two attachment arms adjacent to the first axial end so that the attachment arms can be brought into abutment with a first side of the first component adjacent to the opening of the first component. The attachment arms may be arranged opposite to each other. Due to the projection of the attachment arms in the radial direction to the outside of the base element, a longitudinal axis of the attachment arms runs perpendicular to the longitudinal axis of the base element. The attachment arms therefore provide a limitation in the axial direction when the base element or the fastening arrangement is inserted into the opening of the first component. The insertion of the fastening arrangement may be carried out such that the fastening structure may be inserted into the opening from the side of the first component which faces away from the second component or from the side of the first component which faces towards the third component, respectively. With respect to the later use, the area of the fastening arrangement of the attachment arms is therefore arranged in the direction of the second axial end of the base element in the space between the first and the second component. It is only the area of the fastening arrangement of the attachment arms into the direction of the first axial end of the base element which protrudes from the side of the first component which faces towards the third component.

Alternatively or additionally, it may be preferred that the fastening arrangement comprises two holding segments which are in particular W-shaped and which provide an attachment surface axially spaced from the first axial end of the base element, so that the attachment surface can be brought into abutment with a second side of the first component adjacent to the opening of the first component. The holding segments may also be arranged opposite to each other. Particularly in case of an embodiment with attachment arms, the attachment arms and the holding segments are arranged such that the surfaces of the attachment arms which come into contact with the first component and the attachment surfaces of the holding segments which come into contact with the first component include an angle of approximately 90° when the attachment arrangement is viewed from the first or the second axial end of the base element. In other words, the attachment arms and the attachment surfaces of each respective holding segments are arranged such that the longitudinal axis of the attachment arms, projected into the plane of the attachment surfaces of the holding segments with an axis which connects two attachment surfaces of the same holding segment on the shortest way, forms an angle of 90°. Accordingly, an axis which connects two attachment surfaces of adjacent holding segments on the shortest way, runs parallel to the longitudinal axis of the attachment arms. A spacing between the attachment surfaces of the holding segments and the side of the attachment arms which faces towards the second axial end of the base element may be bigger than the material strength of the first component, so that there is a play along the longitudinal axis of the fastening arrangement.

The holding segments guarantee that the base element can be fastened reliably in the first component and cannot fall out of the first component contrary to an insertion direction. A fastening function in the later use, i.e. in particular a derivation of force, is not realized by the holding segments, as explained at the beginning. In particular, the holding segments provide an elastic or springing locking structure, which realizes an interlocking or form-fit connection with the first component.

The operating principle of the attachments arms as well as of the holding segments is exemplary described at a W-shaped holding segment and the insertion into a rectangular opening in the first component. In this case, the holding segments allow a torque-proof arrangement in the first component. The W-shaped holding segments are axially spaced from the attachment arms at the outside of the base element. In particular, a middle web of the W-shaped structure is arranged below the attachment arms so that a right and a left leg of the W-shaped structure is arranged laterally to the respective attachment arm. As the longitudinal axis of the attachment arms may run perpendicular to the longitudinal axis of the base element, the longitudinal axis of the middle web of the W-shaped holding segments runs parallel to the longitudinal axis of the base element.

During the insertion of the fastening arrangement, with the adjusting unit arranged in front, into the opening in the first component, the legs of the W-shaped structure firstly spring to the inside. After having moved the W-shaped structure through the opening, the legs of the W-shaped structure spring back to the outside. In this connection, the attachment arms provide a limitation in the insertion direction, while the W-shaped structure provides a limitation opposite to the insertion direction after springing back. By means of this configuration, a movement of the fastening arrangement within the opening can be realized to a limited extent, so that tolerances in this plane can be compensated. Furthermore, a torque-proof arrangement in the first component can be reached by means of the two W-shaped holding segments.

In the initial state of the fastening arrangement, the different embodiments of the holding segments which were discussed at the beginning should be considered with respect to the attachment surfaces of the holding segments. In the first embodiment, in which the holding segment is arranged at an angle, the attachment surfaces of the holding segments lie in a plane which is defined in one direction by an axis being parallel to the longitudinal axis of the attachment arms and which encompasses an angle unequal 90° with the longitudinal axis of the base element.

In the second embodiment, in which the holding segment is pivotable about an axis of the plane, the attachment surfaces are arranged in a plane perpendicular to the longitudinal axis of the base element in the initial state. Thus, this plane is defined in one direction also by an axis that is parallel to the longitudinal axis of the attachment arms, it does, however, include an angle of 90° with the longitudinal axis of the base element in the initial state.

With respect to an arrangement of the pivotable holding segments at the base element, different embodiments may be preferred. In a first alternative, and when the base element also comprises attachment arms, it may be preferred that each of the holding segments is arranged at one of the attachment arms over an elastic partial portion, in particular a flexible spring. In a second alternative, it may be preferred that, axially spaced from the first axial end of the base element, the base element comprises a pin that is protruding from the axial end of the base element to the outside. Within this second alternative, it may additionally be preferred that the holding segments comprise an opening each so that the holding segments are clippable on the pin and can be arranged there in a freely pivotable manner. Clippable means that the pin can enter into a form-fit locking connection with the opening in the middle web of the holding segment, with the pin comprising a conically shaped head, so that moving the holding segment onto the pin is facilitated and taking off is made difficult. Both alternatives have in common that the holding segments are pivotable exactly about one axis and can compensate an angle only there, too.

In a further embodiment, the base element comprises a housing, in particular out of plastic material, as well as a nut, that is arranged, particularly embedded, therein, which provides the first inner thread. The nut can consist of plastic material or metal. In another embodiment, the dragging unit comprises a dragging element, which may be out of plastic material, as well as an attachment disc, which may be out of metal, with the dragging element being held in the adjusting unit by means of a press fit. In this connection, it may also be preferred when the adjusting unit comprises a thread sleeve out of plastic material, with the dragging element being held by means of a press fit in the thread sleeve. The dragging element may comprise a first and a second axial end, with the first axial end being arranged flush with a first end of the attachment disc and a second side, which may be opposite to the first side, abuts on the adjusting unit. By means of this embodiment, particularly the first thread pairing can be provided out of plastic material, so that the first inner thread as well as the first outer thread are defined threads. The first thread pairing out of the outer thread of the adjusting unit and the inner thread of the base element alternatively may be a metal-metal thread pairing, due to which higher forces can be transmitted compared with plastic material. Combinations thereof can be realized, too. Furthermore, due to the attachment disc out of metal, a good force transmission to the second component can be achieved.

In a further embodiment, the base element and the adjusting unit comprise interacting structures, which, in the screwed in state of the adjusting unit, form a counter lock and/or transport lock. Such counter locks and/or transport locks are known within the frame of such fastening arrangements. For example, the base element comprises a projection at the second axial end in the axial direction, which, in the screwed-in state of the adjusting unit, interacts with a radial projection at an end of the adjusting unit which projects from the base element, in particular formed by a radial recess at the attachment disc. This will be discussed later on with reference to the embodiments.

A first component comprises a fastening arrangement, with the fastening arrangement particularly being clipped into an opening of the first component. By clipping in, an interlocking connection between the fastening arrangement, in particular the holding segment, and the first component is made, e.g. via flexible locking arms, as was described above in connection with the fastening arrangement. With regard to the arising advantages, reference is made to the explanations regarding the fastening arrangement in order to avoid unnecessary repetitions.

A first and a second component are fastened to each other by means of the fastening arrangement as well as by means of a fastening screw. With regard to the advantages which arise as a result, reference is made to the fastening arrangement.

In a further embodiment, the fastening screw is screwed into a fastening nut which is arranged at a third component, while the first component is a roof membrane, the second component is a body structure and the third component is a roof rail. In this way, with the fastening arrangement, a fastening of the roof rail at the body structure can be realized in case of an intermediate roof membrane which does not run parallel to the body structure.

A manufacturing method of a fastening arrangement includes the following steps: providing a base element with a first and a second axial end comprising a holding structure at a radial outer side for holding the base element in an opening of the first component, providing an adjusting unit with a dragging unit, screwing the adjusting unit into the base element from the second axial end of the base element into the base element. In a further embodiment, the base element comprises a first inner thread and the adjusting unit comprises a first outer thread, with the first outer thread of the adjusting unit together with the first inner thread of the base element forming a first thread pairing of a first thread direction. Therefore, screwing the adjusting unit into the base element takes place via the first thread pairing of the first thread direction. This first thread direction is for example a left-handed thread, while the second thread direction is defined by a right-handed thread. The fastening arrangement can be obtained with the manufacturing method so that with respect to the resulting advantages, reference can again be made to the explanations above.

It may also be preferred that the step of providing the base element comprises: providing the holding structure of the base element with two attachment arms adjacent to the first axial end of the base element so that the attachment arms can be brought into abutment with a first side of the first component adjacent to the opening of the first component, with the attachment arms may be arranged opposite to each other. Alternatively or in addition, it may be preferred that the step of providing the base element comprises: providing two holding segments, which are in particular W-shaped and which provide an attachment surface that is axially spaced from the first axial end of the base element, so that the attachment surface can be brought into abutment with a second side of the first component adjacent to the opening of the first component. The attachment arms provide a limitation in the insertion direction of the base element, while the holding segments guarantee that the base element can be fastened reliably in the first component and cannot fall out of the first component contrary to the insertion direction.

With regard to the arrangement of the pivotable holding segments at the base element, it should be distinguished between two alternative fastening possibilities. In a first alternative, and provided that the attachment arms are available, each holding segment may be arranged via an elastic partial portion, in particular a bending spring, at one of the attachment arms. In a second alternative, the base element each comprises a pin which protrudes radially to the outside, axially spaced from the first axial end, and the holding segments each comprise an opening so that the method includes the further step of arranging the holding segments on the pin. With both alternatives, pivoting the holding segments about one axis, only, can be realized, so that in case of the first and the second component not being arranged parallel, an angle between the first and the second component can be compensated.

Advantageously, the step of providing the base element includes: providing a nut and arranging the nut in a housing material of the base element, in particular by means of embedding in a plastic material. The nut can consist of metal or plastic material. It may also be preferred that the step of providing the adjusting unit comprises: providing a thread sleeve and a dragging unit comprising an attachment disc, may be out of metal, and of a dragging element, may be of plastic material. The manufacturing method comprises the further step: pressing the dragging element into the thread sleeve that may be screwed into the base element so that an attachment disc is flush with a first end of the dragging element and abuts on a second side that is opposite to the first side at the thread sleeve. In this way, the dragging unit or dragging element, respectively, can be provided out of plastic material, the thread sleeve may consist of plastic material. The first thread pairing out of outer thread of the adjusting unit and inner thread of the base element may be a plastic-plastic thread pairing, so that the threads are defined precisely, or a metal-metal thread pairing, leading to higher transmissive load in comparison with plastic material. Combinations of that can be realized, too. In case of a metal-metal thread pairing, it may be preferred that the thread sleeve of the adjusting unit is first of all screwed into the base element. The screwing depth in this case is for example chosen such that after connecting the attachment disc with the thread sleeve, the elements of the transport lock engage with each other or are arranged adjacent to each other. Only after screwing the thread sleeve into the base element does the attachment disc connect tightly with the thread sleeve by means of pressing the dragging element into the thread sleeve.

In a further embodiment, the base element and the adjusting unit comprise interacting structures which form a counter lock and/or transport lock in the screwed in state of the adjusting unit. As already described above, such counter locks and/or transport locks in case of fastening arrangements with a tolerance compensation function are known so that such a counter lock and/or transport lock is only discussed within the detailed embodiments.

An assembly method of a fastening arrangement, in particular of a fastening arrangement, comprises the steps: inserting the fastening arrangement into a first opening of a first component, with the fastening arrangement comprising a base element with a first and a second axial end which comprises a holding structure for holding the base element in the first opening of the first component at a radially outer side, and an adjusting unit which can be screwed into the base element with a dragging unit inserted therein, with the holding structure of the base element comprising a holding segment which is arranged, with respect to a plane, perpendicular to the longitudinal axis of the base element in an angle or is pivotable about an axis of the plane, arranging a second component in a distance to the first component with a fastening arrangement inserted therein, inserting a fastening screw through an opening in the second component until the fastening screw comes into engagement with the dragging unit, rotating the fastening screw which causes the adjusting unit to rotate conjointly, to move in abutment with the second component and then an angle between the first and the second component is compensated by means of the holding structure such that a longitudinal axis of the fastening arrangement runs perpendicular to a plane of the second component, and after that, screwing the fastening screw into a fastening nut. By means of the assembly method, a connection between a first, a second and a third component can in particular be generated due to the fastening arrangement. With regard to the corresponding advantages, in particular with reference to the angular compensation function, reference is made to the explanations above.

4. BRIEF DESCRIPTION OF THE ACCOMPANYING DRAWINGS

Figure 2:
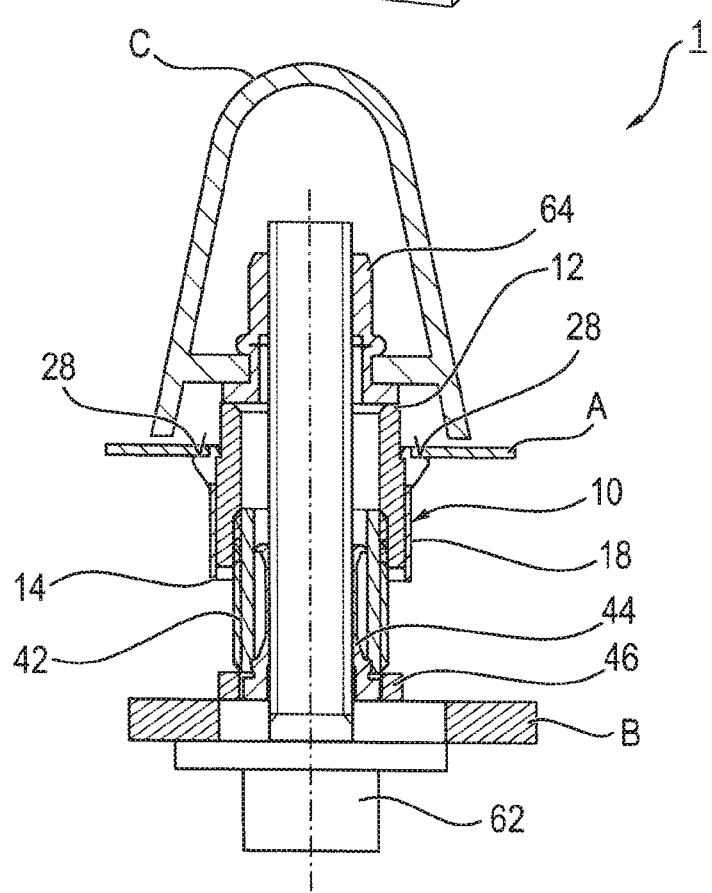
Figure 3:
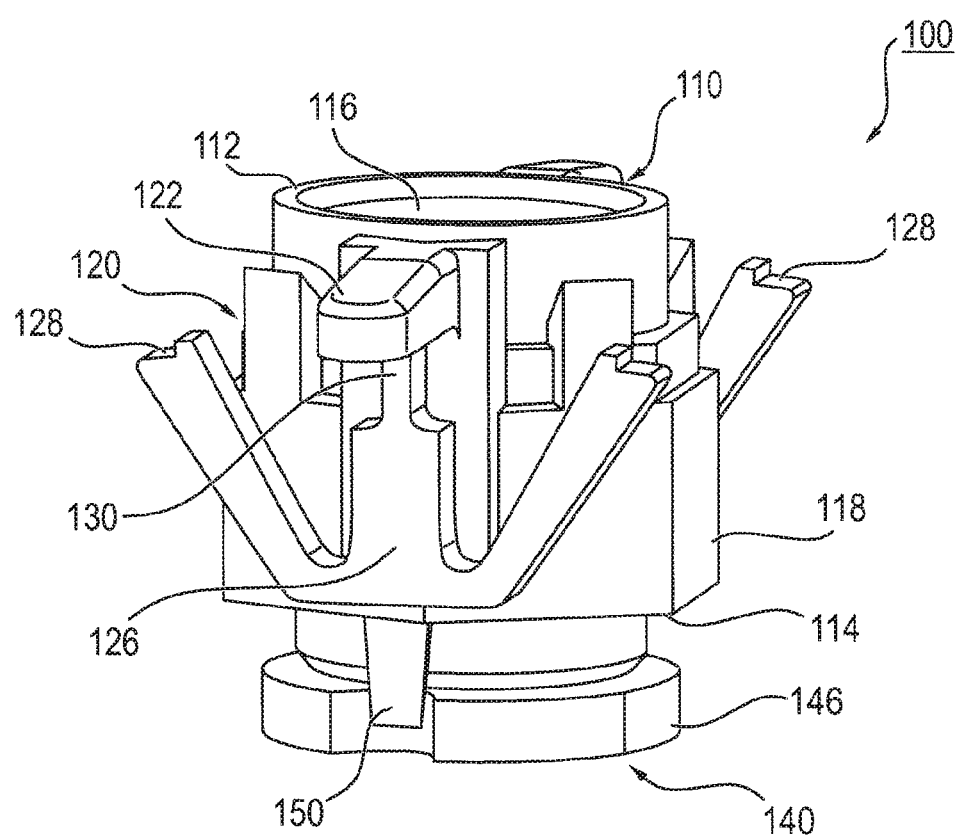
Figure 4:
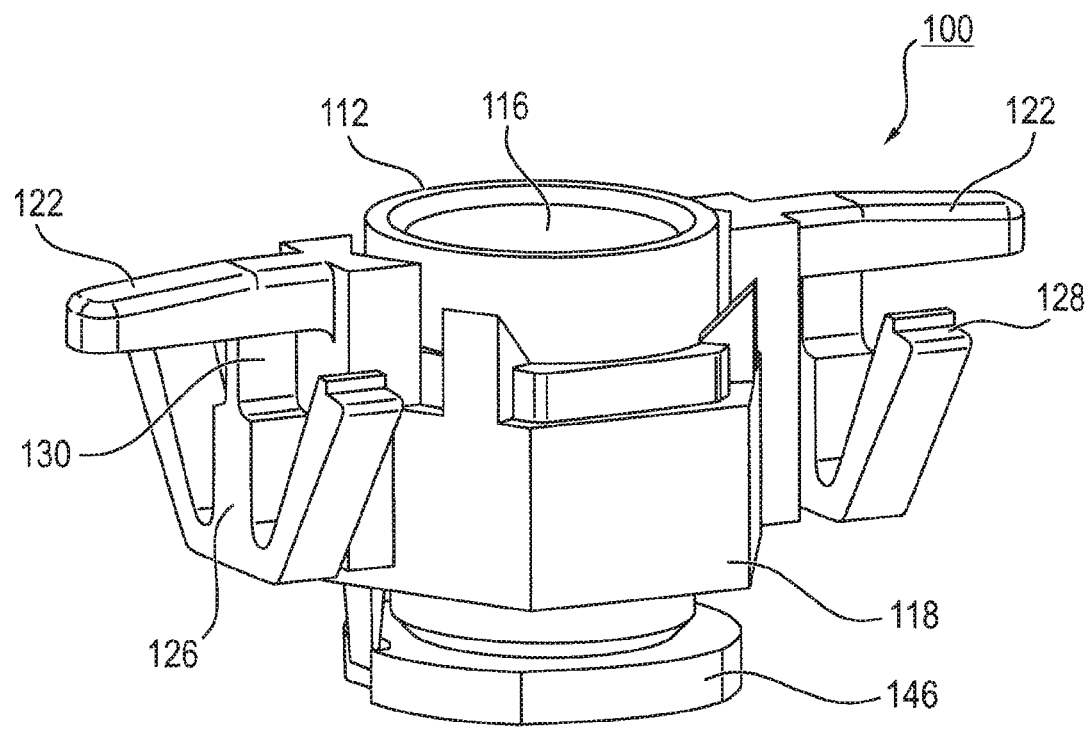
Figure 5:
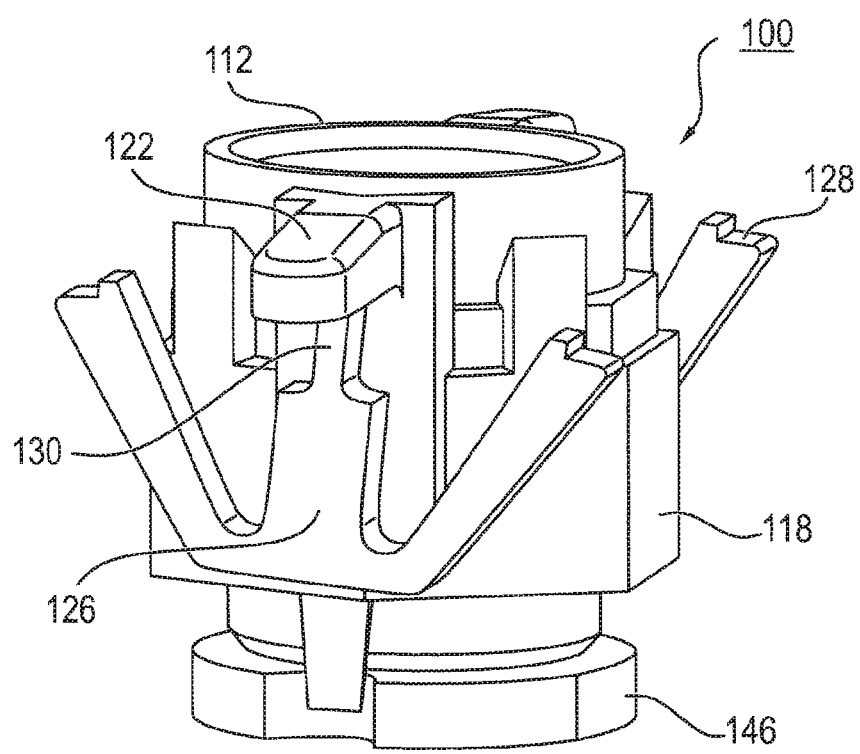
Figure 6:
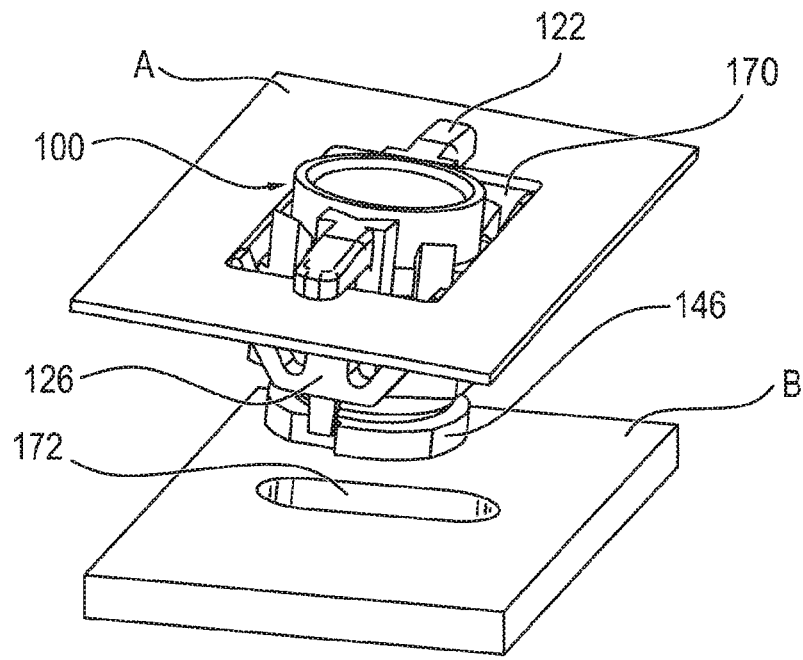
Figure 7:
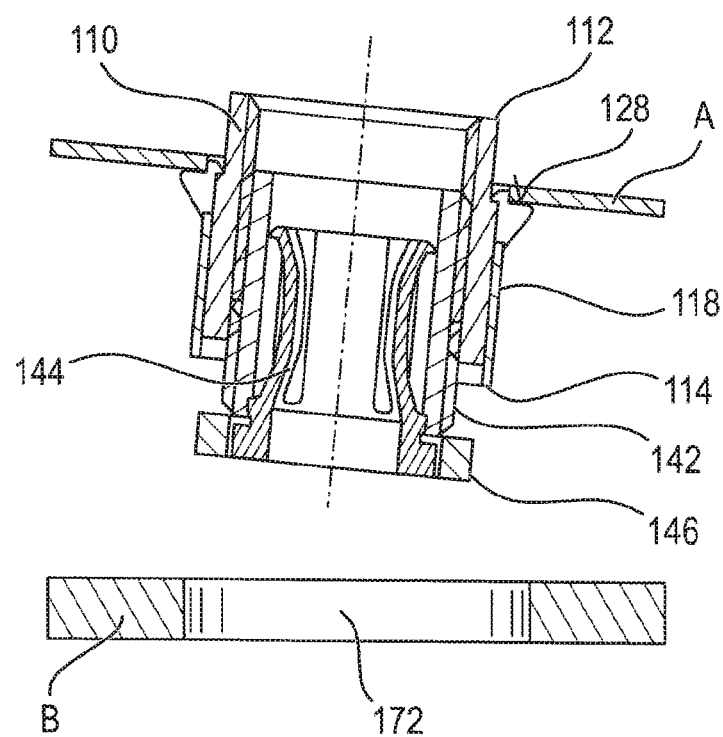
Figure 8:
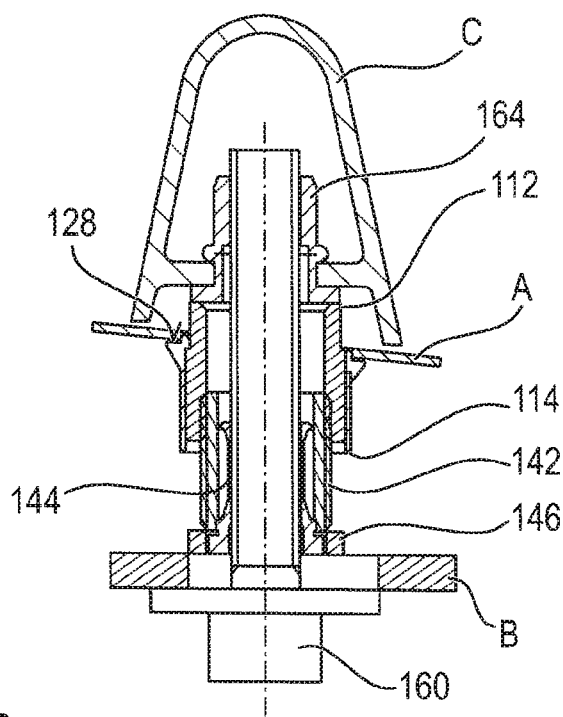
Figure 9:
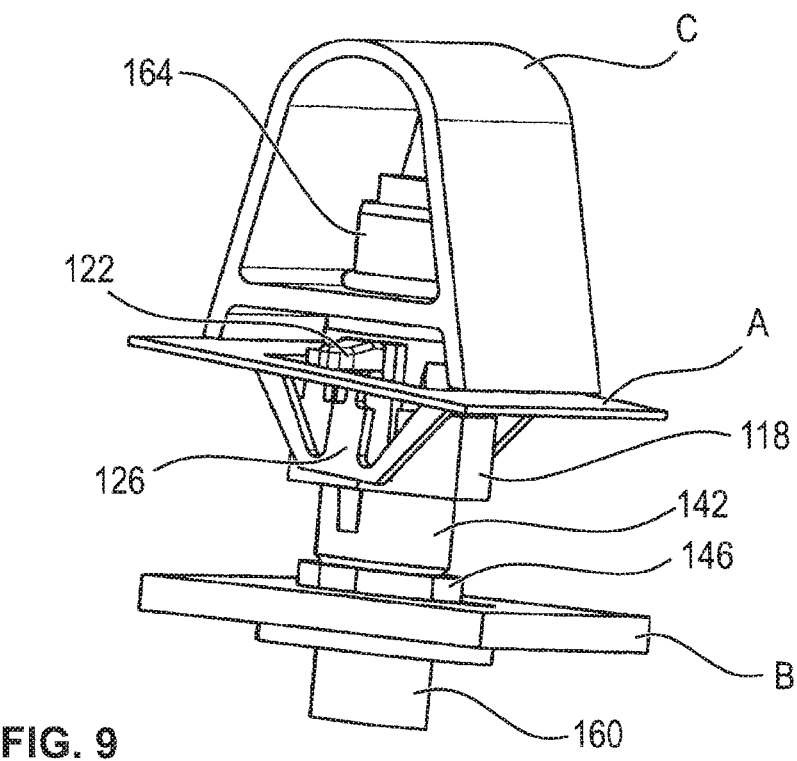
Figure 10:
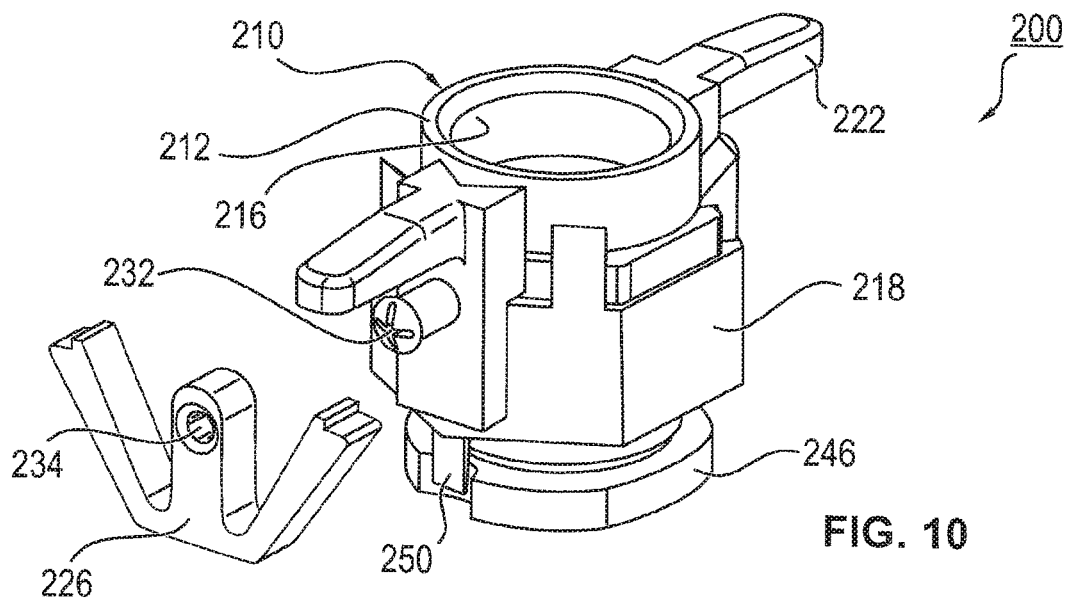
Figure 11:
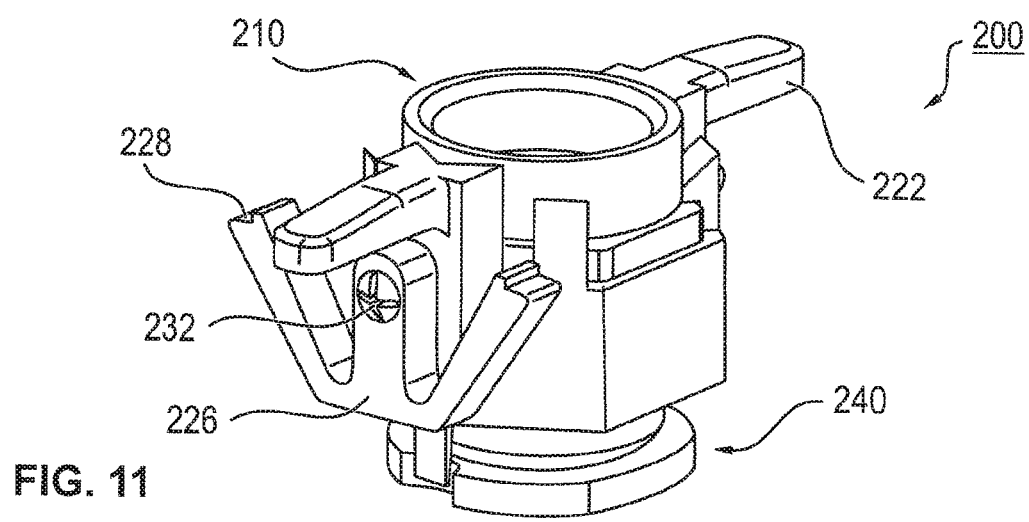
Figure 12:
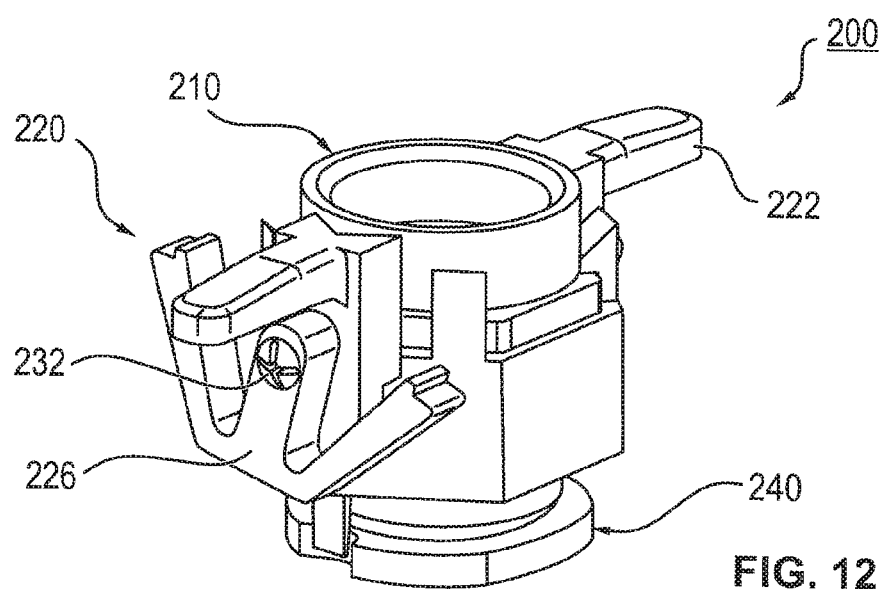
Figure 13:
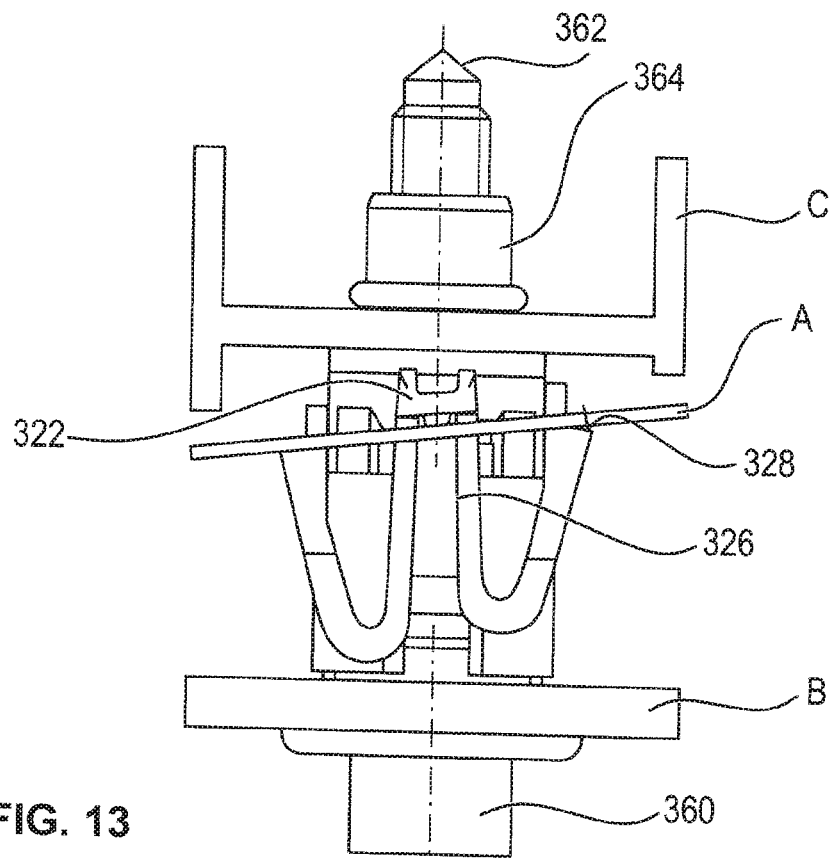
Figure 14:
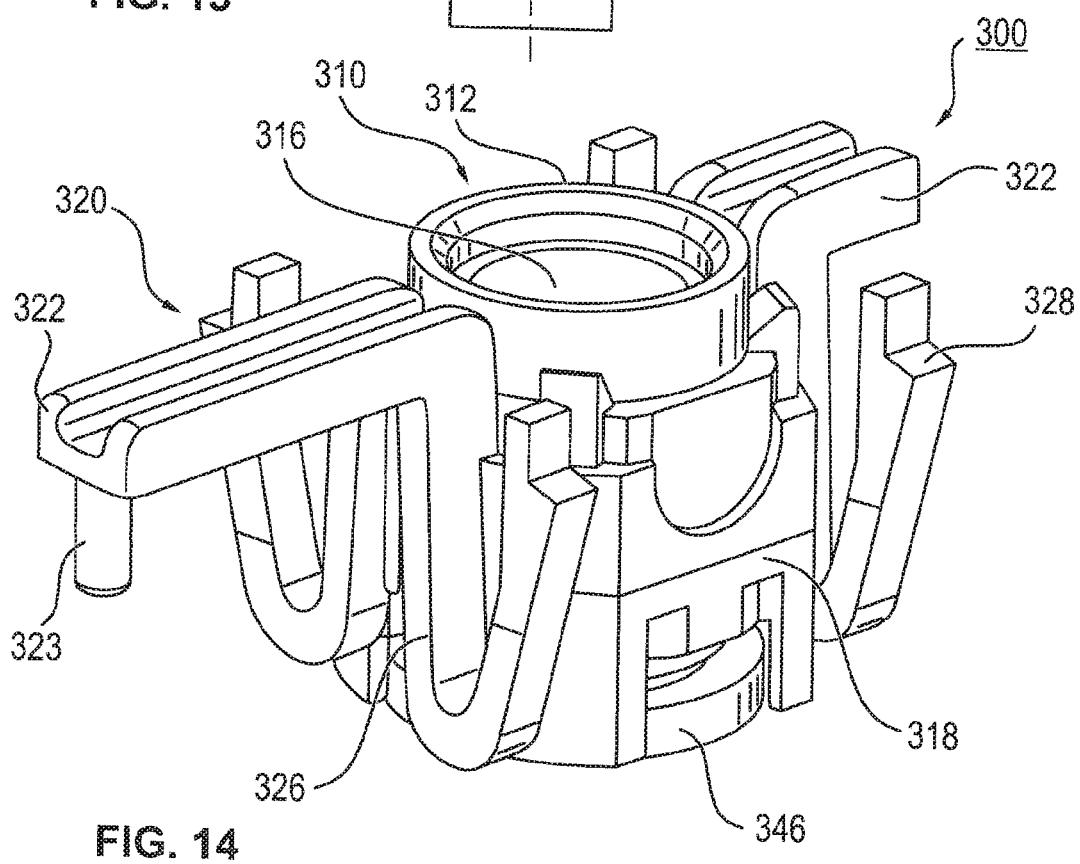
Figure 15:
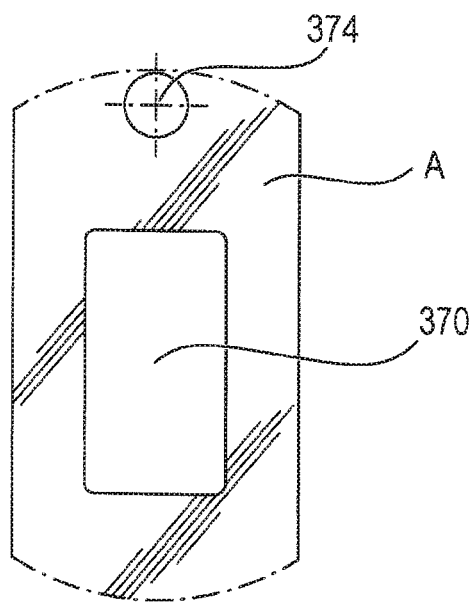
Figure 16:
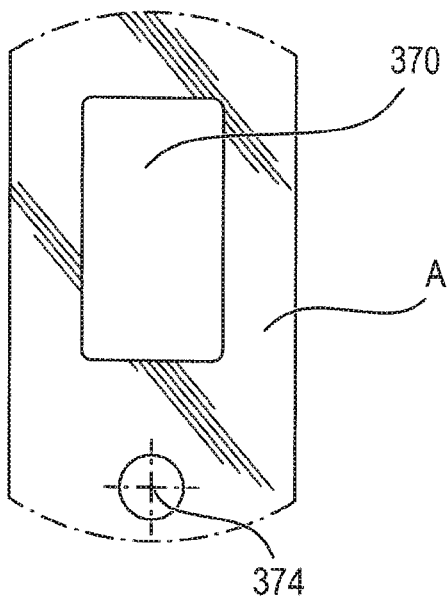
Figure 17:
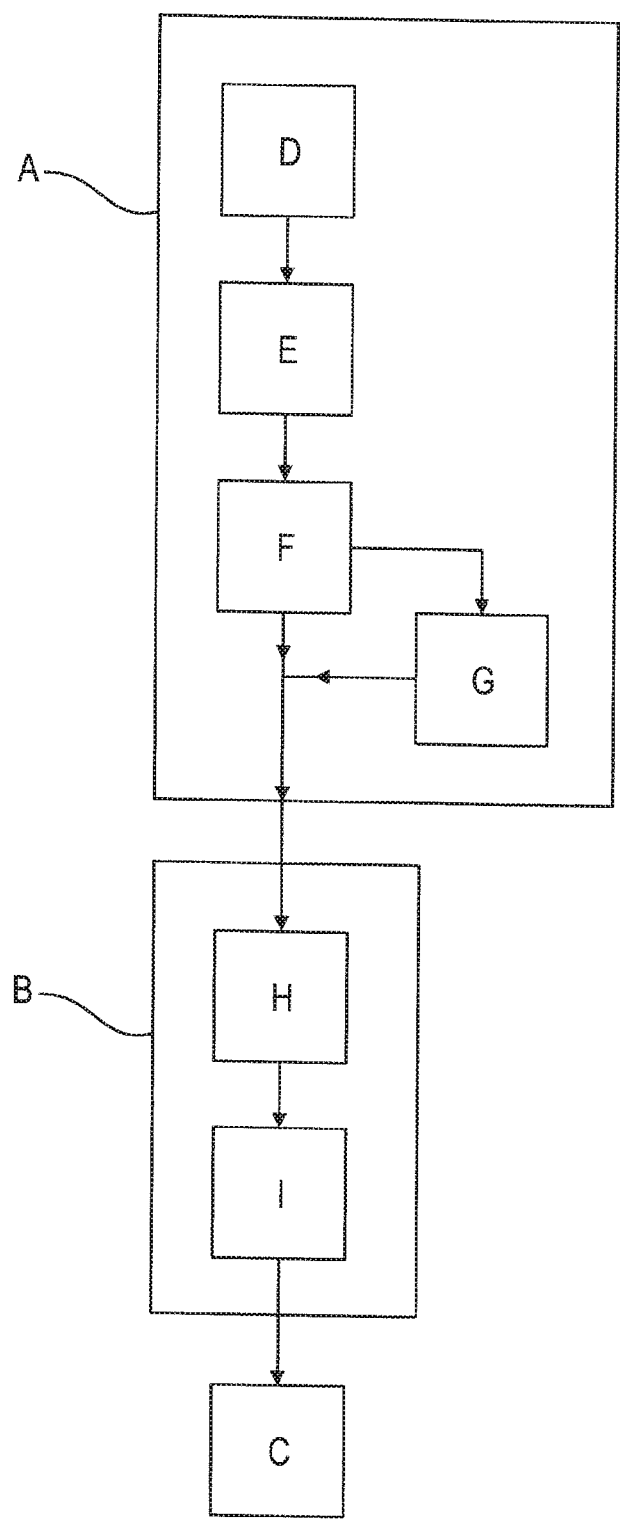
Figure 18:
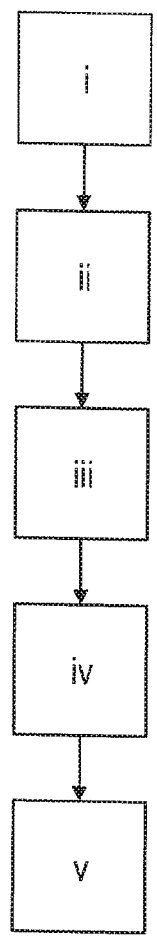

In the following, the present disclosure will be described in detail with reference to the drawings. In the drawings, the same reference signs denote the same components and/or elements. It shows:

FIG. 1 a view of an embodiment of a fastening arrangement without an angular compensation function, FIG. 2 a cross section of an embodiment of the fastening arrangement according to FIG. 1 in the assembled state, FIG. 3 a first view of an embodiment of a fastening arrangement with an angular compensation function, FIG. 4 a second view of the fastening arrangement according to FIG. 3, FIG. 5 a third view of the fastening arrangement according to FIG. 3, FIG. 6 a view of the fastening arrangement according to FIG. 3, which is inserted into the first component, FIG. 7 a cross section of the fastening arrangement according to FIG. 6, FIG. 8 a cross section of the fastening arrangement according to FIG. 3 in the assembled state, FIG. 9 a perspective view of the embodiment according to FIG. 8, FIG. 10 a first view of a second embodiment of a fastening arrangement in a partially exploded view, FIG. 11 a second view of the embodiments according to FIG. 10, FIG. 12 a third view of the embodiments according to FIG. 10, FIG. 13 a lateral view of a third embodiment of a fastening arrangement in the assembled state, FIG. 14 a perspective view of the third embodiment of the fastening arrangement, FIG. 15 a first section of a first component for use with a fastening arrangement, FIG. 16 a second section of a first component for use with a fastening arrangement, FIG. 17 a schematic course of the procedure of an embodiment of the manufacturing method, and FIG. 18 a schematic course of the procedure of an embodiment of the assembling method.

5. DETAILED DESCRIPTION

In the following, an embodiment of a fastening arrangement 1 without angular compensation function is described in detail. Based on that, different embodiments of the fastening arrangement 100; 200; 300 with angular compensation function are described. All fastening arrangements 1; 100; 200 and 300 are arrangements for fastening a first component A to a second component B with an automatic compensation in the spacing between the first component A and the second component B. In particular, by means of the fastening arrangements 1; 100; 200 and 300, a third component C is fastened to the second component B without additionally loading the first component A. The first component A is, for example, a roof membrane, while the second component B is a body structure and the third component C is a roof rail. Compared with the second component B, the first component A is therefore a thin-walled component.

With reference to FIGS. 1 and 2, the fastening arrangement 1 comprises a base element 10 and an adjusting unit 40 that is screwed into the base element 10. The base element 10 comprises a first axial end 12, a second axial end 14, a first inner thread 16 and a holding structure 20 at its radial outer side for holding the base element 10 in an opening 70 of the first component A. The inner thread 16 is provided by a nut or a thread sleeve out of metal or plastic material. Furthermore, the base element 10 comprises a housing 18 or a cage, which particularly consists of plastic material, encompasses the nut and comprises the holding structure 20 which may be an integral component.

In the initial state, the adjusting unit 40 is screwed into the base element 10 and comprises a thread sleeve 42 out of metal or plastic material which provides a first outer thread of the adjusting unit 40. The first outer thread of the adjusting unit together with the first inner thread 16 of the base element 10 form a first thread pairing of a first thread direction, which is defined by a left-handed thread in particular. The adjusting unit 40 is screwed into the base element 10 from the second end 14 of the base element. By means of these embodiments, the first thread pairing can be provided out of plastic material or metal. In case of plastic material as the material for the first thread pairing, one is then talking of defined threads. In case of metal as the material for the first thread pairing, higher loads can be received by the fastening arrangement 1 compared with plastic material. Material combinations can be realized, too, so that the fastening arrangement 1 can be adapted specifically to the respective application case.

Furthermore, the adjusting unit 40 comprises a dragging unit consisting of a dragging element 44 as well as an attachment disc 46. The dragging element 44 may consist of plastic material and the attachment disc 46 may be of metal. By pressing the dragging element 44 into the thread sleeve 42, the dragging element 44 connects the thread sleeve 42 and the attachment disc 46 in a correctly positioned way. Thus, the dragging element 44 is held in the adjusting unit 40 and particularly in the thread sleeve 42 by means of a press fit. Furthermore, the dragging element 44 comprises a first axial end, which is arranged flush with a first side of the attachment disc 46. A second side opposing the first side of the attachment disc 46 abuts on the thread sleeve 42. A good force transmission to the second component B can be achieved particularly with an attachment disc 46 out of metal.

In the completely screwed in state of the adjusting unit 30, a counter lock and/or transport lock 50 locks the adjusting unit 40 in the base element 10. The counter lock and/or transport lock 50 is formed by two interacting components of the base element 10 and the adjusting unit 40. In the illustrated embodiment, the counter lock and/or transport lock 50 consists of a projection provided at the second axial end 14 of the base element 10, the projection interacting with a radial recess provided at the attachment disc 46. Generally, counter locks and/or transport locks are known in connection with fastening arrangements with a tolerance compensation function.

Adjacent to the first axial end 12 of the base element 10, the holding structure 20 includes two attachment arms 22 as well as four clipping arms 25 axially spaced from that. The attachment arms 22 protrude radially to the outside from the housing 18, are arranged opposite to each other and can be brought into abutment with a first side of the first component A adjacent to the opening 70 of the first component A. A longitudinal axis of the attachment arms 22 runs perpendicular to the longitudinal axis of the base element 10. In the later use, the attachment arms 22 provide an axial limitation in the insertion direction.

Out of the four clipping arms 25, two clipping arms 25 are each connected via a connecting web 24 with one attachment arm 22 each and can spring into the direction of the connecting web 24. The structure out of the two clipping arms 25 that are connected via a connecting web 24 is also called W-shaped structure. A middle web of this W-shaped structure, which corresponds with the connecting web 24 or is connected with it, is therefore arranged below the attachment arms 22 so that a right and a left leg of the W-shaped structure, i.e. a respective clipping arm 25, is arranged laterally from the respective attachment arm 22. As the longitudinal axis of the attachment arms 22 runs perpendicular with respect to the longitudinal axis of the base element 10, the longitudinal axis of the middle web of the W-shaped structure as well as of the connecting web 24 runs parallel with respect to the longitudinal axis of the base element 10.

Each one of the clipping arms 25 provides an attachment surface 28 for the first component A. The attachment arms 22 and the clipping arms 25 are arranged such that the longitudinal axis of the attachment arms 22 when being projected into the plane of the attachment surfaces 28 of the clipping arms 25 forms an angle of 90° with an axis, which connects two attachment surfaces 28 of two clipping arms 25 that belong to the same W-shaped structure. That means that the surfaces of the attachment arms 22 which come into contact with the first component A and the attachment surfaces 28 of the clipping arms 25 which come into contact with the first component A enclose an angle of approximately 90°. An axis, which connects two attachment surfaces 28 of adjacent clipping arms 25 of different W-shaped structures at the shortest way, runs parallel to the longitudinal axis of the attachment arms 22. The attachment surfaces 28 are limited in the direction of the connecting web 24 by an axial projection, on which the first component A also abuts in use.

The operating principle of the holding structure 20 is described in the following based on the use of the attachment arrangement 1 with reference to FIG. 2. The fastening arrangement 1 is inserted into a rectangular opening 70 in the first component A in an insertion direction until it comes into abutment with the attachment arms 22 on the first component A. In this connection, the insertion of the fastening arrangement 1 is carried out from the side of the first component A which faces away from the second component B, i.e. the side of the first component A which later faces towards the third component C. The axial second end 14 of the base element 10 is arranged at the front in the insertion direction.

During insertion of the fastening arrangement 1, with a corresponding adjusting unit 40 arranged in front, into the opening 70 in the first component A, the clipping arms 25, i.e. the legs of the W-shaped structure, spring to the inside at first. After having moved the clipping arms 25 through the opening 70, the clipping arms 25 spring back to the outside. Therefore, the clipping arms 25 realize an elastic or springing locking structure which realizes an interlocking connection with the first component A. The axial spacing between the attachment surfaces of the attachment arms 22 and the attachment surfaces 28 of the clipping arms 25 at the first component A is bigger than the material strength of the first component A in the portion of the opening 70. Therefore, a safe clipping-in or locking is given even in case of a slight curvature of the first component A. In this way, there is a play along the longitudinal axis of the fastening arrangement 1.

Therefore, the attachment arms 22 provide a limitation in the insertion direction while the clipping arms 25, after springing back, provide a limitation contrary to the insertion direction. Moving the fastening arrangement 1 within the opening 70 can be realized to a limited extent with this holding structure 20, so that tolerances in this plane can be compensated. Furthermore, the clipping arms 25 in connection with the housing 18 realize a torque-proof arrangement of the fastening arrangement 1 in the first component. After the insertion into the first component A.

After inserting the fastening arrangement 1 into the first component A and arranging the first component A with a distance to the second component B, the portion of the fastening arrangement 1 of the attachment arms 22 is arranged in the direction of the second axial end 14 of the base element 10 in the intermediate space between the first A and the second component B. Now, the third component C is positioned on the first component A so that the portion of the fastening arrangement 1 protrudes from the attachment arms 22 into the direction of the first axial end 12 of the base element 10 from the first component A in the direction of the third component C. In this way, the first component A with the fastening arrangement is arranged between the second B and the third component C.

A fastening screw 60 is guided through the opening 72 in the second component B, which is a long hole, and comes into engagement with the dragging element 44 of the adjusting unit 40. The fastening screw 60 comprises a second outer thread of a second thread direction which is contrary to the first thread direction. By rotating the fastening screw 60 in the second thread direction, the adjusting unit 40 is screwed out of the base element 10 until the attachment disc 46 comes into abutment with the second component B.

By further rotating the fastening screw 60, a play between the attachment surfaces 28 of the clipping arms 25 and the first component A is compensated. As the first axial end 12 of the base element 10 is axially spaced from the attachment surfaces 28 of the clipping arms 25, there is a defined distance between the first component A and the first axial end 12 of the base element 10. In this connection, the first axial end 12 of the base element 10 provides an attachment surface for a fastening nut 64 in the third component C. In this way, it is guaranteed that a gap between the first component A and the third component C is constant.

A fastening of the fastening screw 60 is carried out in the fastening nut 64 in the third component C, which comprises a suitable inner thread of a second thread direction. As a result, the third component C is exclusively fastened at the second component B in this way, so that the first component A does not have to take up any load due to the fastening. The first component A has to bear the pressure of a sealing between the first component A and the third component C, only.

As, however, no angular compensation can be realized with this fastening arrangement 1, the first A and the second component B must imperatively run parallel to each other.

Now, with reference to FIGS. 3 to 9, a first embodiment of a fastening arrangement 100 with an angular compensation function is discussed. The structure basically corresponds with the structure discussed above, so that in the following, the differences with regard to the above discussed embodiment are mainly described.

The fastening arrangement 100 comprises a base element 110 with an adjusting unit 140 screwed therein. The construction of the adjusting unit 140 corresponds with the construction of the adjusting unit 40. With regard to the base element 110, it differs with respect to the construction of the holding structure 120.

Beside the two attachment arms 122, the holding structure 120 comprises two holding segments 126. The holding segments 126 are W-shaped and provide an attachment surface 128 for the first component A. In this connection, a connection of the holding segments 126 to the attachment arms 122 does, however, not take place via a rigid connecting web 24 but via an elastic partial portion 130, which is in particular formed as a bending spring.

In a direction perpendicular to the longitudinal axis of the base element and perpendicular to the longitudinal axis of the attachment arms 22, the elastic partial portion 130 is so thin that the respective holding segment 126 can easily be brought out of a middle position with the legs. In a direction parallel to the longitudinal axis of the attachment arms 122, the elastic partial portion 130 is configured as long as the remaining portion of the holding segment 126 in this direction in order to guarantee that the respective holding segment 126 can rotate about one axis, only. Therefore, the holding segments 126 are pivotable about an axis parallel to the longitudinal axis of the attachment arms 122. A relation of the material strength of the elastic partial portion 130 in a direction perpendicular to the longitudinal axis of the base element and perpendicular to the longitudinal axis of the attachment arms 122, with reference to the direction parallel to the longitudinal axis of the attachment arms 122, is for example 1:2, or 1:2.5 or 1:3.

In the initial state of the fastening arrangement 100, the attachment surfaces 128 are therefore, just as in case of the fastening arrangement 1, arranged in a plane perpendicular to the longitudinal axis of the base element 110. Therefore, this plane is defined in one direction by an axis that is parallel to the longitudinal axis of the attachment arms 122, and includes or encloses an angle of 90° with the longitudinal axis of the base element 110 in the initial state.

An insertion of the fastening arrangement 100 into an opening 170 in the first component A takes place analogously to the above-described insertion for the fastening arrangement 1. The fastening arrangement 1 is therefore inserted into the rectangular opening 170 in the first component A until it abuts on the attachment arms 122 on the first component A. As described above, the shape of the housing 118 of the base element 110 is such, that the base element 110 is supported in a torque-proof manner in the opening 170 of the first component A and that an effortless movement within the plane of the opening 170 is possible to a limited extent, so that tolerances in this direction can be compensated. In this case, too, a spacing between the attachment surfaces of the attachment arms 122 and the attachment surfaces 128 of the holding segments 126 is bigger than the material strength of the first component A, so that a safe insertion or clipping or locking, respectively, is given, even in case of a slight curvature of the first component A, i.e. the exemplary roof membrane. In this embodiment, the longitudinal axis of the fastening arrangement 100 is aligned perpendicular with respect to the plane of the opening 170 in the first component A after inserting.

After inserting the fastening arrangement 1 into the first component A and arranging the first component A in a distance to the second component B, the third component C is positioned on the first component A. In this way, the first component A with the fastening arrangement is arranged between the second B and third component C.

A fastening screw 160 is guided through the opening 172 that is configured as a long hole in the second component B and comes into engagement with the dragging element 144 of the adjusting unit 140. A simple insertion of the fastening screw 160 into the adjusting unit 140 is possible although the first component A and the second component B are not arranged parallel to each other as the opening 172 in the second component B is configured as a long hole. The opening 172 or long hole, respectively, runs perpendicular to the longitudinal axis of the attachment arms 122. For a further facilitation, the fastening screw 160 can comprise a center point.

When the attachment disc 146 of the adjusting unit 140 now initially abuts on the second component B, the holding segments 126 pivot over the elastic partial portion 130 with respect to the housing 118 or the longitudinal axis of the base element 110, respectively, until the attachment disc 146 of the adjusting unit 140 abuts parallel on the second component B. In this way, the fastening arrangement 100 is aligned perpendicular with respect to the plane of the opening 172 of the second component B, which positively supports a later force transmission from the third component C to the second component B. This also follows that the holding segments 126, which realize the angular compensation, are not involved in a force transmission.

By further rotating the fastening screw 160, the play between the attachment surfaces 128 of the holding segments 126 and the first component A is compensated. A fastening of the fastening screw 160 is carried out in the fastening nut 164 in the third component C, which comprises a suitable inner thread of a second thread direction. As the profile of the third component C is adapted to the contour of the first component A, the attachment surface of the fastening nut 164 now has a defined position again with respect to the first component A due to the abutment on the first axial end 112 of the base element 110 and an even gab between the first A and the third component C arises again.

A special advantage of this fastening arrangement 100 is, that it can also be used when the angular deviations are different at different fastening points.

FIGS. 10 to 12 show another embodiment of a fastening arrangement 200. The fastening arrangement 200 essentially corresponds with the fastening arrangement 100, so that reference is made to the corresponding explanations.

In contrast to the above explanations regarding the fastening arrangement 100, the holding segments 226 are, however, not connected with the attachment arms 222. Rather, the housing 218 of the base element 210 comprises two pins 232 which are arranged at the housing 218 and radially project to the outside and are arranged radially spaced from the attachment arms 222. A longitudinal axis of the pins 232 therefore runs parallel with respect to the longitudinal axis of the attachment arms 222. The pins 232 comprise a conically shaped head and a cylindrical portion, with the head being arranged at a distance from the housing 218.

For fastening the holding segments 226 on the pins 232, a corresponding opening 234 is provided in the middle web of the W-shaped structure. The pins 232 and the openings 234 of the holding segments 226 jointly form a clipping connection or locking connection, respectively, so that the holding segments 226 are held in a pivotable manner on the pins 232. Due to this arrangement, the holding segments 226 can again pivot about one axis, only. Due to the conical head of the pins 232, moving the holding segments 226 on the pin 232 is facilitated and taking off is made difficult. As the operating principle of the fastening arrangement 200 is similar to the above-discussed fastening arrangement 100, reference is made to the corresponding explanations. In contrast to the above-described fastening arrangement 100, an automatic pivot movement can already arise after inserting due to the holding segments 226 which are positioned on the pins 232, depending on the angle to be compensated respectively. A disadvantage of the fastening arrangement 200 compared with the fastening arrangement 100 is the higher number of parts and the resulting higher costs.

A further embodiment of a fastening arrangement 300 is shown in FIGS. 13 and 14. In the basic construction, the fastening arrangement 300 corresponds with the fastening arrangements 1; 100 and 200 as discussed before. However, the fastening arrangement 300 differs from the other fastening arrangements 1; 100 and 200 in that the holding segments 326 are already arranged in a fixed angle with respect to the longitudinal axis of the base element 310, so that the attachment surfaces 328 of the holding segments 326 also define a fixed angle. The attachment surfaces 328 of the holding segments 326 therefore lie in a plane which is defined by an axis which is parallel to the longitudinal axis of the attachment arms 322 in one direction and which, together with the longitudinal axis of the base element 310, includes an angle unequal 90°.

A difference when using such a fastening arrangement 300 is that the longitudinal axis of the base element 310 is aligned perpendicular to the plane in the opening in the second component already when the first component A is inserted. Therefore, the fastening screw 360, which is illustrated with a center point 362 in this embodiment, can be inserted into the fastening arrangement 300 particularly easy.

A prerequisite for the economic use of such a fastening arrangement 300 is, that the angular deviations are more or less the same at a large number of fastening points. In order to insert the fastening arrangement 300 with respect to the roof membrane as a first component A both on the right side as well as on the left side, one of the two attachment arms 322 has a molded centering pin 323. This procedure is particularly advantageous when the angle of the first component is the same on both sides with respect to the second component in view of the absolute value of the angle.

The centering pin 323 extends from the radial outer end of the attachment arm 322 into the direction of the second axial end of the base element 310 and may include an angle of 90° with the attachment arm 322. In order to guarantee the correct positioning in the first component A, the first component A therefore has a corresponding centering opening 374. This is exemplary shown for both sides of a roof membrane as the first component A in FIGS. 15 and 16.

Now, with reference to FIG. 17, a schematic course of procedure of an embodiment of a manufacturing method is described. First of all, in a first step A, a base element 110; 210; 310 with a first 112; 212; 312 and a second axial end 114 is provided, comprising a holding structure 120; 220; 320 at a radial outer side for holding the base element 110; 210; 310 in an opening 170; 370 of the first component A.

The step A of providing the base element 110; 210; 310 can comprise the following further steps for this purpose. For example, in step D, a nut can be provided and the nut can be arranged in a housing material of the base element 110; 210; 310, in particular by means of embedding in a plastic material. The nut can consist of metal or plastic. The housing 118; 218; 318 comprises the holding structure 120; 220; 320, which may be an integral component. Therefore, in step E, a provision of the holding structure 120; 220; 320 of the base element 110; 210; 310 with two attachment arms 122; 222; 322 adjacent to the first axial end 112; 212; 312 of the base element 110; 210; 310 can be intended so that the attachment arms 112; 212; 312 can be brought into abutment with a first side of the first component A adjacent to the opening 170; 370 of the first component A, with the attachment arms 122; 222; 322 which may be arranged opposite to each other.

Alternatively or in addition to that, it may be preferred that in step F, a provision of two holding segments 126; 226; 326 is intended, which are in particular W-shaped and which provide an attachment surface 128; 228; 328 axially spaced from the first axial end 112; 212; 312 of the base element 110; 210; 310, so that the attachment surfaces 128; 228; 328 can be brought into abutment with a second side of the first component A adjacent to the opening 170; 370 of the first component A. With respect to the arrangement of the pivotable holding segments 126; 226 at the base element, it should be distinguished between two alternative fastening possibilities. In a first alternative, and provided that the attachment arms 122 are present, it may be preferred that each holding segment 126 is arranged via an elastic partial portion 130, in particular a bending spring, at one of the attachment arms 122. In a second alternative, axially spaced from the first axial end 212, the base element 210 has a respective pin 232 which protrudes radially to the outside and the holding segments 226 comprise an opening 234 so that the method comprises the further step G of arranging the holding segments 226 on the pin 232.

After, before or at the same time of providing the base element 110; 210; 310, a provision of an adjusting unit 140;

240 with a dragging unit takes place in step B. The base element 110; 210; 310 comprises a first outer thread 116; 216; 316 and the adjusting unit 140; 240 a first inner thread, with the first outer thread of the adjusting unit 140; 240 together with the first inner thread of the base element 110; 210; 310 forming a first thread pairing of a first thread direction. In this connection, the step of providing the adjusting unit 140; 240 can comprise the following further steps. Firstly, in step H, a provision of a thread sleeve 142 and a dragging unit can take place, which comprises an attachment disc 146; 246; 346, may be out of metal, and a dragging element 144, may be out of plastic material. In this case, the further step I is intended: pressing the dragging element 144 into the thread sleeve 142 that is screwed into the base element 110; 210; 310, so that an attachment disc 146; 246; 346 is flush with a first side with a first end of the dragging element 144 and abuts with a second side, that is opposite to the first side, on the thread sleeve 142. In conclusion, the thread sleeve 142 is already screwed into the base element 110; 210; 310 before the dragging element 144 is pressed into the thread sleeve 142. This is explained in detail below. In this way, the dragging unit or dragging element 144, respectively, can be provided out of plastic material, with the thread sleeve 142 may consist of plastic material.

Finally, in step C, the adjusting unit 140; 240 is screwed into the base element 110; 210; 310 from the second axial end 114 of the base element 110; 210; 310. Screwing the adjusting unit 140; 240 into the base element 110; 210; 310 takes place via the first thread pairing of the first thread direction. This first thread direction is for example a left-handed thread, while the second thread direction is defined by a right-handed thread. The base element 110; 210; 310 and the adjusting unit 140; 240 may comprise interacting structures, which form a counter lock and/or transport lock in the screwed-in state of the adjusting unit 140; 240.

In particular with respect to the thread, that is produced by machining, of the first thread pairing, i.e. in case of a nut out of metal and a thread sleeve 142 out of metal, an alternative course of proceedings may be preferred. After providing the base element 110; 210; 310 and providing the adjusting unit 140; 240, in particular of the separated components thread sleeve 142, dragging element 144 and attachment disc 146; 246; 346, the thread sleeve 142 is screwed into the base element 110; 210; 310 up to a defined height. The defined height for example arises from a later interaction of the elements of the counter lock and/or transport lock. Now, the attachment disc 146 is connected with the thread sleeve 142 in a correctly positioned way, i.e. the transport lock is in engagement. For this purpose, the dragging element 144 is pressed into the thread sleeve 142. The respective adjusting unit 140; 240 and the respective base element 110; 210; 310 are therefore adjusted to each other exactly.

Now, with reference to FIG. 18, a schematic course of procedure of an embodiment of an assembly method is described. In step i, an insertion of the fastening arrangement 100; 200; 300 into a first opening 170; 370 of a first component A takes place. In this connection, the fastening arrangement 100; 200; 300 comprises a base element 110; 210; 310 with a first 112; 212; 312 and a second axial end 114 which comprises a holding structure 120; 220; 320 at a radial outer side for holding the base element 110; 210; 310 in the first opening 170; 370 of the first component A, and an adjusting unit 140; 240 which can be screwed into the base element 110; 210; 310 with a dragging unit inserted therein. The holding structure 120; 220; 320 of the base element 110; 210; 310 comprises a holding segment 126; 226; 326 which, with respect to a plane perpendicular to the longitudinal axis of the base element 110; 210; 310 is arranged at an angle or is pivotable about an axis of the plane.

In a second step ii, an arrangement of a second component B takes place at a distance to the first component A with a fastening arrangement 100; 200; 300 inserted therein. After that, in step iii, a fastening screw 160; 360 is inserted through an opening 172 in the second component B, until the fastening screw 160; 360 comes into engagement with the dragging unit. Subsequently, in step iv, a rotation of the fastening screw 160; 360 takes place, which causes the adjusting unit 140; 240 to rotate conjointly, is moved in abutment with the second component B and, then, an angle between the first A and the second component B is compensated by means of the holding segment 126; 226; 326 such, that a longitudinal axis of the fastening arrangement 100; 200; 300 runs perpendicular to a plane of the second component B. Finally, in step v, screwing the fastening screw 160; 360 into a fastening nut 164; 364 takes place.

The invention claimed is:

1. A fastening arrangement for fastening a first component to a second component with an automatic compensation of tolerances in the distance between the first component and the second component, comprising the following features:
   a. a base element with a first and a second axial end as well as a holding structure at a radial outer side for holding the base element in an opening of the first component, and
   b. an adjusting unit which can be screwed into the base element with a dragging unit inserted therein, while
   c. a fastening screw can be connected with the adjusting unit via the dragging unit by means of a releasable dragging connection, so that when rotating the fastening screw, the adjusting unit can be rotated conjointly and can be moved in abutment with the second component, wherein
   d. the holding structure of the base element comprises two attachment arms adjacent to the first axial end, so that the attachment arms can be brought in abutment with a first side of the first component adjacent to the opening of the first component, with
   e. the holding structure of the base element comprising two holding segments, which provide an attachment surface axially spaced from the first axial end of the base element, so that the attachment surface can be brought in abutment with a second side of the first component adjacent to the opening of the first component, and which, referred to a plane perpendicular to the longitudinal axis of the base element are pivotable about an axis of the plane, so that
      by means of the holding segment, an angle between the first and the second component can be compensated such that when the adjusting unit abuts on the second component, a longitudinal axis of the fastening arrangement runs perpendicular to a plane of the second component.

2. The fastening arrangement according to claim 1, in which
   the base element comprises a first inner thread and the adjusting unit comprises a first outer thread, with the first outer thread of the adjusting unit together with the first inner thread of the base element forming a first thread pairing of a first thread direction and with the adjusting unit can be screwed into the base element from the second axial end of the base element, and the fastening screw comprises a second outer thread of a second thread direction, which is opposite to the first thread direction, and can be inserted through an opening of the base element and the adjusting unit, so that the adjusting unit can be moved by rotating the fastening screw in the second thread direction in abutment with the second component.

3. The fastening arrangement according to claim 2, wherein the two holding segments are W-shaped.

4. The fastening structure according to claim 2, in which the base element comprises a housing as well as a groove that is arranged therein and which provides the first inner thread.

5. The fastening arrangement according to claim 2, in which the dragging unit comprises a dragging element as well as an attachment disc with the dragging element being held in the adjusting unit by means of a press fit.

6. The fastening arrangement according to claim 1, in which the attachment arms are arranged opposite to each other.

7. The fastening arrangement according to claim 6, wherein each of the holding segments is arranged via an elastic partial portion at one of the attachment arms.

8. The fastening arrangement according to claim 1, wherein the two holding segments are W-shaped.

9. The fastening arrangement according to claim 8, which, axially spaced from the first axial end of the base element, each comprises a pin which radially protrudes from the base element to the outside.

10. The fastening arrangement according to claim 9, in which the holding segments each comprise an opening, so that the holding segments can be clipped onto the pin and can be arranged there in a freely pivotable manner.

11. The fastening arrangement according to claim 1, wherein each of the holding segments is arranged via an elastic partial portion at one of the attachment arms.

12. The fastening structure according to claim 1, in which the base element comprises a housing as well as a groove that is arranged therein and which provides the first inner thread.

13. The fastening arrangement according to claim 1, in which the dragging unit comprises a dragging element as well as an attachment disc with the dragging element being held in the adjusting unit by means of a press fit.

14. The fastening arrangement according to claim 13, in which the dragging element comprises a first and a second axial end, with the first axial end being arranged flush with a first side of the attachment disc and a second side opposite to the first side of the attachment disc abuts on the adjusting unit.

15. The fastening arrangement according to claim 1, in which the base element and the adjusting unit comprise interacting structures which form a counter lock and/or transport lock in the screwed-in state of the adjusting unit.

16. A first component in combination with the fastening arrangement according to claim 1.

17. A first and a second component which are fastened to each other through the fastening arrangement according to claim 1 by means of the fastening screw.

18. The first and the second component according to claim 17, with the fastening screw being screwed into a fastening nut which is arranged at a third component, while the first component is a roof membrane, the second component is a body structure and the third component is a roof rail.

* * * * *